United States Patent [19]

Freudenschuss et al.

[11] 4,070,107
[45] Jan. 24, 1978

[54] CINE CAMERA

[75] Inventors: Otto Freudenschuss; Otto Kantner; Peter Revy von Belvard, all of Vienna, Austria

[73] Assignees: Karl Vockenhuber; Raimund Hauser, both of Vienna, Austria

[21] Appl. No.: 669,338

[22] Filed: Mar. 22, 1976

Related U.S. Application Data

[63] Continuation-in-part of Ser. No. 460,136, April 11, 1974, abandoned.

[30] Foreign Application Priority Data

Apr. 16, 1973 Austria .................................. 3383/73
Apr. 19, 1973 Austria .................................. 3485/73
May 24, 1973 Austria .................................. 4565/73

[51] Int. Cl.$^2$ ............................................. G03B 23/02
[52] U.S. Cl. .......................................... 352/72; 352/27
[58] Field of Search ................ 352/26, 27, 29, 30, 352/72; 242/199

[56] References Cited

U.S. PATENT DOCUMENTS

T920,009  3/1974  Kosarko ................................. 352/29
3,825,327  7/1974  Kosarko ................................. 352/29
3,880,504  4/1975  Marvin ................................... 352/27

Primary Examiner—Monroe H. Hayes
Attorney, Agent, or Firm—Montague & Ross

[57] ABSTRACT

A cine camera for taking talking pictures comprises a film-feeding mechanism which includes a driven capstan and a pinch roller normally spaced therefrom to facilitate insertion of a section of film therebetween when the camera casing is loaded with a sound-film cassette. A sensor, upon detecting the presence of such cassette in a receiving chamber of the casing, causes the pinch roller to move closer to the capstan, either via a mechanical linkage or by deactivating a detent normally blocking a displacement of the pinch roller under spring pressure. This displacement under the control of the sensor may establish a standby position, with the pinch roller still separated from the capstan by a clearance wider than the film thickness, that clearance being subsequently reduced by the operation of a trigger, a mode-selector switch or the like to clamp the film between pinch roller and capstan. The biasing pressure acting upon the pinch roller may be supplied by a toggle spring which is rendered effective by a prestressing mechanism upon closure of a lid for the cassette-receiving chamber.

10 Claims, 18 Drawing Figures

CINE CAMERA

CROSS-REFERENCE TO RELATED APPLICATION

This is a continuation-in-part of our copending application Ser. No. 460,136 filed Apr. 11, 1974 and now abandoned.

FIELD OF THE INVENTION

Our present invention relates to a cine camera adapted to accommodate a motion-picture film having a sound track, the camera being provided with an exposure or image gate and sound-recording means.

BACKGROUND OF THE INVENTION

In such a cine camera the film must be transported intermittently, by the usual reciprocating-claw mechanism, past the exposure gate and at substantially constant speed past the recording head, An advantageous constant-speed feeder comprises a driven capstan and a pinch roller serving to clamp the film between itself and the capstan. Means for co-ordinating the two drives have been described in our prior application referred to above and in our copending application Ser. No. 669,085 filed Mar. 22, 1976 as a continuation-in-part thereof now U.S. Pat. No. 4.003,643.

As further disclosed in that prior application and in the aforementioned continuation-in-part thereof, as well as in our copending application Ser. No. 669,110 filed on even date herewith as another continuation-in-part of that prior application, the pinch roller and the capstan should be widely separated during the loading of the camera with a sound-film cassette in order to provide the necessary clearance for the insertion of an unsupported stretch of film therebetween; upon such insertion, and prior to the operation of a release button or trigger to start the film drive, the pinch roller and/or the capstan must be displaced to reduce their separation in order that a sound film can be engaged and transported thereby. Such displacement need not immediately clamp the film between the capstan and the pinch roller but may establish an intermdiate or standby position from which the clamping position is reached upon operation of the trigger. In accordance with the disclosure of our copending application last referred to, the relative displacement of the pinch roller and the capstan from a retracted position to at least a standby position is carried out with the aid of a manually operable external actuating member on the camera casing, that actuating member being independent of the trigger and comprising for example a bar manipulable by the fingers of a user or a door or lid of a cassette-receiving chamber.

OBJECT OF THE INVENTION

The object of our present invention is to provide means for making the operation of a film-clamping mechanism, as described above, conditional upon the insertion of a sound-film cassette in the camera casing, particularly where the camera can be used with physically distinguishable types of cassettes for sound and silent films, respectively.

SUMMARY OF THE INVENTION

We realize this object, in accordance with our present invention, by the provision of sensing means in the camera casting for detecting the presence of a sound-film cassette in its cassette-receiving chamber, the sensing means controlling an actuating mechanism coupled with a support for the pinch roller in order to move that roller out of a retracted position remote from the capstan into an alternate position proximal to the capstan preparatorily to operation of the trigger.

It should be understood, however, that the capstan could also be moved toward and away from the pinch roller, such a kinematic inversion (as well as the possibility of displacing both the capstan and the pinch roller) coming therefore within the scope of our invention.

The actuating mechanism responsive to the presence of a sound-film cassette in the receiving chamber may comprise a linkage extending from the sensing means to the pinch-roller support, that linkage advantageously including biasing means for resiliently urging the pinch roller toward the capstan whenever such a cassette is detected. The displacement of the pinch roller into its clamping position may be prevented by stop means arresting that roller in its standby position, the stop means being deactivable by an operating member such as a mode-selector switch which is ineffectual in the normal or retracted roller position. Alternatively, the actuating mechanism may include a detent coupled with the sensing means for blocking the displacement of the pinch-roller support by a biasing force toward the capstan as long as no sound-film cassette is present in the chamber. Such a biasing force is advantageously supplied by a toggle spring.

BRIEF DESCRIPTION OF THE DRAWING

The above and other features of our invention will now be described in detail with reference to the accompanying drawing in which.

SPECIFIC DESCRIPTION

Figure 1:
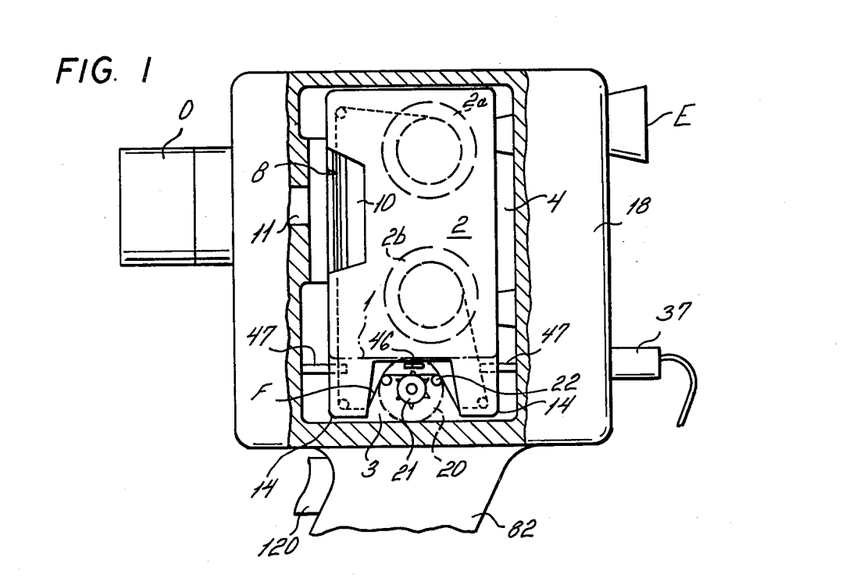
FIG. 1 is a side-elevational view, with parts broken away, of a cine camera embodying our invention.

In FIG. 1 we have shown a motion-picture camera 18 provided with a chamber 4 for receiving either a sound-film cassette 2, shown in full lines, or a silent-film cassette 1, indicated by a dot-dash outline. Reference may be made to our aforementioned U.S. Pat. No. 4,003,643 for a more detailed description of these cassettes.

Sound-film cassette 2 differs from silent-film cassette 1 by the presence of a pair of lateral extensions or legs 14, the height of this cassette thus exceeding that of cassette 1 by the length of these legs. The film F travels from a supply spool 2a to a takeup spool 2b by way of cutout 10 and a recess 3 bracketed by the legs 14. The film F thus extends freely across the recess 3 so as to co-operate, on the one hand, with a recording head 46 and, on the other hand, with a feed mechanism represented in FIG. 1 by a sprocket 21 driven at substantially constant speed by a motor 20. To engage the perforations of film F with the teeth of the sprocket, the cassette 2 is inserted into the reception chamber 4 of the camera in a slightly tilted position, legs first, with the unsupported part of film F intercepted by a pair of rods 22 just below the recording head 46. As the cassette is thrust down to let its legs come to rest against the chamber bottom, the film F is deflected to assume the position shown in FIG. 2. The upper part of the cassette can then be pushed in for indexing by a nonillustrated detent in its upright position whereupon a lid or door 104 (FIG. 8) can be closed.

In this inserted position, cutout 10 confronts an image gate 11 in line with the camera objective O. The camera is further shown provided with an eyepiece E and a handle 82 equipped with the usual release button or trigger 120; handle 82 may contain the batteries for powering the motor 20 as well as the drive or a reciprocating traction claw 8 engageable with the film perforations in the vicinity of image gate 11 as is well known per se.

Figure 2:
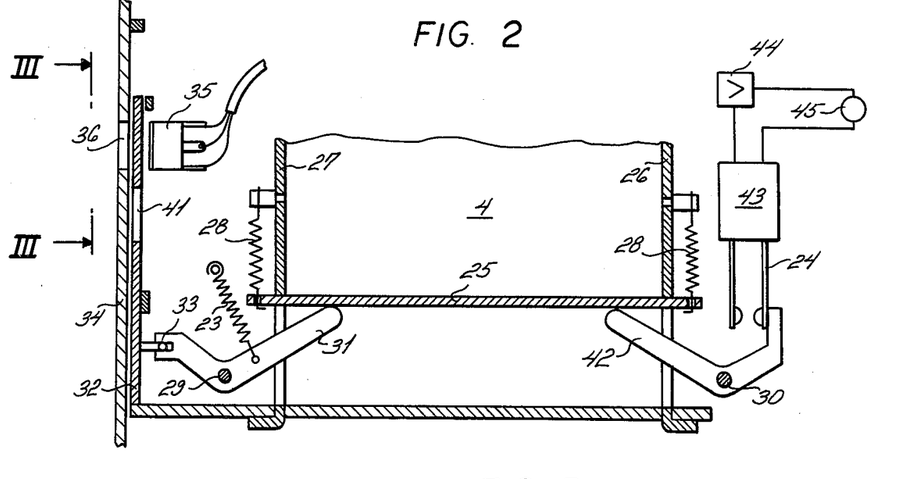
FIG. 2 is a somewhat diagrammatic sectional view, drawn to a larger scale, of a modified lower part of the camera shown in FIG. 1.

A nonillustrated microphone may be connected to recording head 46 via a plug 37 receivable in a jack 35 (FIG. 2).

A sensing mechanism, designed to detect the presence of a sound-film cassette 2 in chamber 4, comprises a pair of feelers 47 more fully illustrated in FIGS. 4 - 6 described hereinafter. The feelers 47, projecting from the rear into the chamber 4, are repressed against respective biasing springs 50 (FIGS. 5 and 6) by the legs 14 when the cassette 2 is inserted in the aforedescribed manner. If, on the other hand, the camera is loaded with a silent-film cassette 1, whose lower edge lies at a level 17 just above the feelers 47, these feelers are not pushed back but help support the cassette 1 in the camera casing.

An alternate sensing mechanism has been illustrated in FIG. 2 where the receiving chamber 4 is laterally bounded by a pair of sidewalls 26, 27 and is provided with a vertically movable bottom plate 25 guided in slits of these sidewalls. Plate 25 is suspended by a pair of springs 28 tending to maintain it in its illustrated elevated position.

Two feelers 31 and 42, replacing the feelers 47 of FIG. 1, are designed as bell-crank levers pivotable about respective fulcra 29, 30 and are held onto the underside of plate 25 by a coil spring 23 and a contact spring 24, respectively. Spring 24 forms part of a switch 43 which is closed upon a lowering of plate 25 to supply current from a nonillustrated source, such as a power pack in handle 82, via an amplifier 44 to a signal lamp 45 and to the recording head 46 of FIG. 1.

A slide 32, linked via a pin 33 with lever 31, normally obstructs an opening 36 in a wall 34 of the camera casing aligned with the microphone jack 35. Thus, the plug 37 of FIG. 1 cannot be inserted into the jack as long as the plate 25 is in its illustrated elevated position which it maintains when the camera is loaded with the shorter silent-film cassette 1. If, on the other hand, the longer sound-film cassette 2 is introduced into the chamber 4, feeler 31 swings clockwise about its fulcrum 29 and raises the slide 32 into a position in which an aperture 41 thereof registers with the opening 36 to permit insertion of the plug 37. At the same time, the sound-recording unit including head 46 is energized by the switch 43, closed by a counterclockwise swing of feeler 42 about its fulcrum 30, and signal lamp 45 is lit to indicate this condition.

Figures 3, 5:
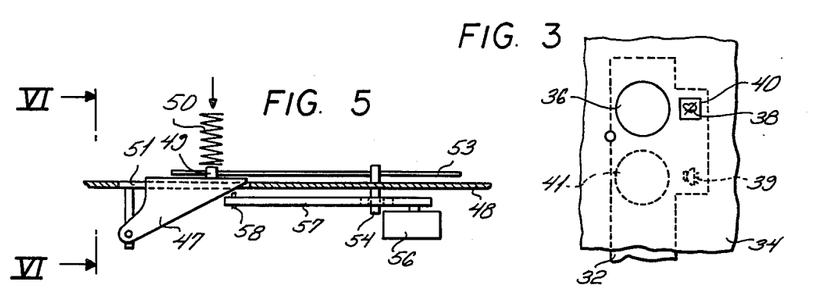
FIG. 3 is a fragmentary side view taken on the line III—III of FIG. 2.
FIG. 5 is a top view of the assembly shown in FIG. 4.

As shown in FIG. 3, slide 32 also carries symbols 38 and 39 which are alternately visible through a window 40 in wall 34 to indicate the absence or the presence of a sound-film cassette within the camera.

Figure 4:
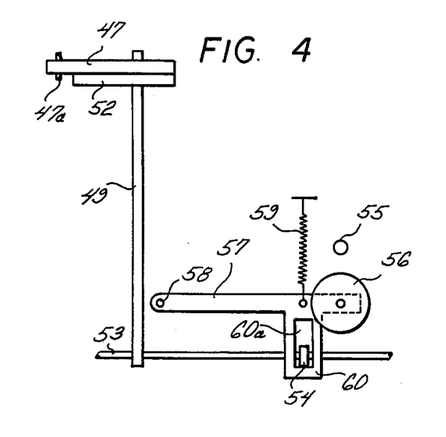
FIG. 4 is a diagrammatic elevational view of part of a sensor-controlled actuating mechanism is a camera according to our invention.
Figure 6:
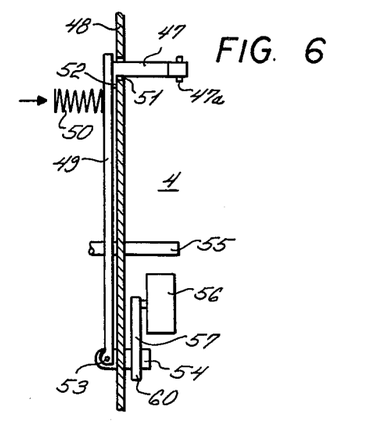
FIG. 6 is a sectional side view taken on the line VI—VI of FIG. 5.

In FIGS. 4 - 6 we have shown another feed mechanism for moving the film F across the recess 3 between legs 14 (FIG. 1) at substantially constant speed while the recording head 46 is in operation. The two feelers 47, only one of which has been illustrated in these Figures, extend through slots 51 in a rear wall 48 of chamber 4 (omitted in FIG. 4 for the sake of clarity) and are pivoted on fixed fulcra 47a in the sidewall of chamber 4. Each feeler is in the shape of a flat shelf, adapted to support a corner of a silent-film cassette 1 as mentioned above, and has a depending skirt 52 normally resting against the back surface of rear wall 48 under the pressure of the corresponding spring 50 which acts upon the feeler through a respective upright arm 49 rigid with a horizontal shaft 53. This shaft, journaled in nonillustrated bearings, carries a lug 54 which passes through an opening in wall 48 and engages in a slot 60a in an extension 60 of a lever 57 which is swingable about a fixed fulcrum 58. The free end of lever 57 carries a pinch roller 56 coacting with a capstan 55 which is continuously driven by the motor 20 (FIGS. 1 and 7) when the sound-recording unit is in operation, the capstan 55 replacing the sprocket 21 of FIG. 1. A tension spring 59 tends to swing the lever 57 counterclockwise, as viewed in FIG. 4, thereby elevating the pinch roller 56 toward the capstan 55 from which it is normally spaced as shown. The force of spring 59, however, is overcome by that of the two springs 50 acting through their respective arms 49, shaft 53 and lug 54 upon lever 57 as long as the feelers 47 are not repressed by the legs 14 of a cassette 2 inserted into the chamber 4. Thus, the separation of capstan 55 from pinch roller 56 facilitates the introduction of the film F into the intervening gap during the loading of the camera. Upon the completion of the loading operation, lug 54 is swung counterclockwise (FIG. 6) to unlock the lever 57 whereby the roller 56 is pulled up by spring 59 to press the film against the rotating capstan 55 so that the film is transported past the recording head 46 (FIG. 1) as soon as a switch 172

(FIG. 7) is closed by a squeezing of the trigger 120. The energization of the capstan drive coincides with the supply of energy to a drive motor 62 for the transport claw 8 as described below with reference to FIG. 7.

Figure 7:
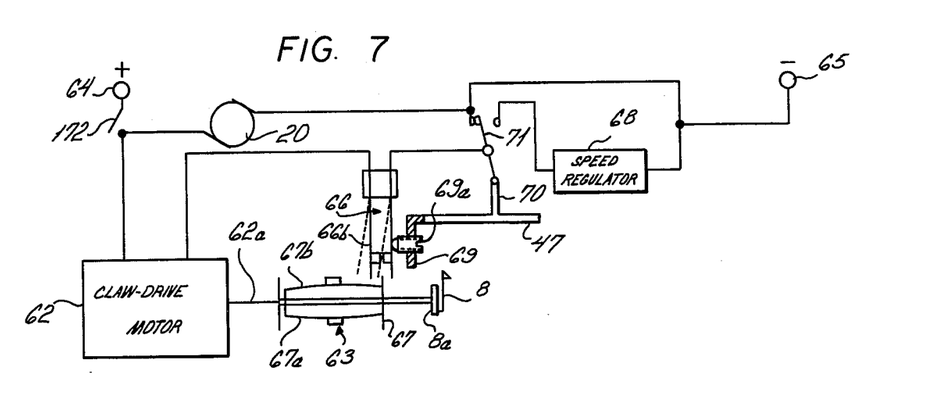
FIG. 7 is a diagram of a speed-regulating circuit for a camera according to our invention.

As shown in FIG. 7, claw-drive motor 62 is connected in parallel with capstan-drive motor 20 across the power supply represented by terminals 64 and 65, the circuits for both motors being closable by the trigger-operated switch 172. Motor 62 lies in series with a switch 66, forming part of a centrifugal governor 63, and with a further switch 71 which is mechanically coupled with an extension 70 of one of the cassette feelers 47. These feelers, or one of them, may also control a nonillustrated switch in series with motor 20 which is opened when no sound-film cassette is inserted into the camera.

Governor 63 comprises a pair of weighted leaf springs 67a, 67b which are interconnected by a ring 67 and are mounted on a shaft 62a of motor 62 carrying an eccentric 8a to which the transport claw 8 is articulated. As soon as the shaft speed reaches a predetermined limit, springs 67a and 67b flex sufficiently to draw the ring 67 into engagement with a contact 66b of switch 66, separating it from its companion contact 66a and breaking the circuit. Thus, the speed of motor 62 and therefore the average feed rate of the film by the claw 8 is stabilized as is well known per se.

The mode of operation just described is suitable only for silent-film operation, i.e. when no other part of the film is simultaneously driven at substantially constant speed by the motor 20 via the sprocket 21 of FIG. 1 or the capstan 55 of FIGS. 4 and 6. For sound-film operation, the absence of correlation between the centrifugal governor 63 and the nonillustrated speed control of motor 20 would tend to damage the film by either overstressing it or causing it to balloon out of the recess 3. It is for this reason that, as particularly claimed in our U.S. Pat. No. 4,003,643, we provide the feeler-controlled switchover means 71 which reverses its position whenever the feeler 47 is repressed by an inserted sound-film cassette 2 as discussed above. The same feeler motion deactivates the centrifugal governor 63 by displacing a stud 69a on an extension 69 of the feeler into engagement with switch contact 66a whereby the two contacts 66a, 66b are jointly deflected beyound the reach of ring 67 so that switch 66 remains closed with any operating speed of motor 62. At the same time, the armature of switch 71 connects the motor 62 to terminal 65 by way of a speed regulator 68 designed to maintain a substantially constant length of film between the claw 8 and the capstan 55 (or the sprocket 21), the motor 62 being thus slaved to the motor 20.

Figure 10A:
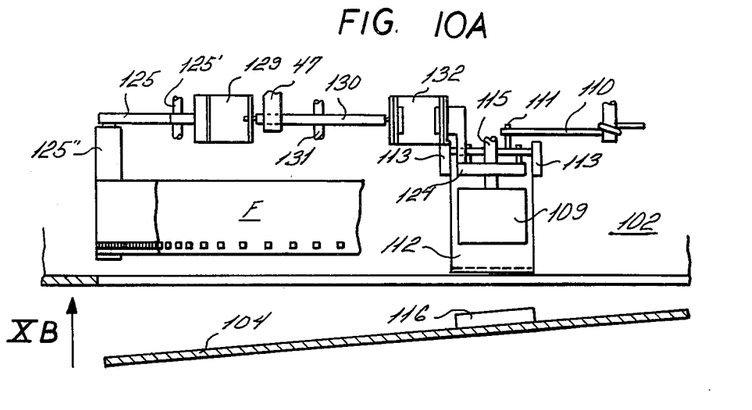
FIG. 10A is a top view of another actuating mechanism according to our invention.
Figure 10B:
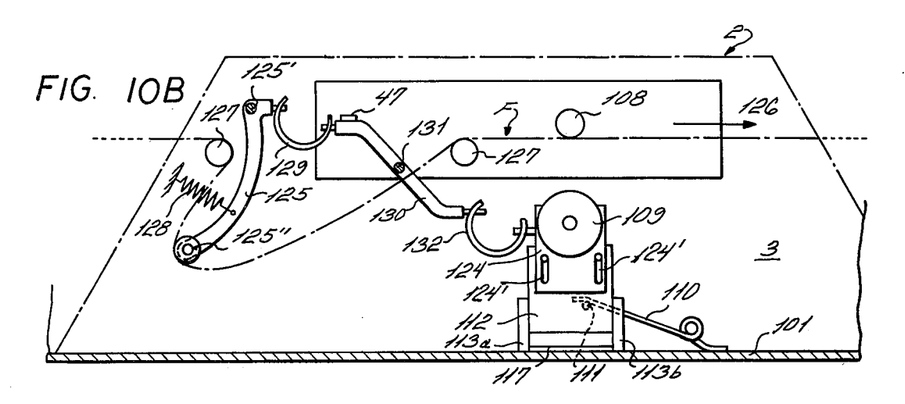
FIG. 10B is an elevational view of the assembly shown in FIG. 10A (as seen in the direction of arrow XB)

Speed regulator 68 may comprise any device capable of measuring the length of the stretch of film lying between cutout 10 and recess 3, e.g. by counting the number of perforations in the stretch. As disclosed in our U.S. Pat. No. 4,003,643, this regulator can include a detector for a loop formed by the film F, substantially as shown in FIGS. 10A and 10B described hereinafter, the detector comprising a bell-crank lever oscillating slightly about its fulcrum as the film loop tightens and slackens. Excessive tension, indicative of an insufficient claw speed, swings the lever in one sense to short-circuit a resistance in series with the motor circuit so as to accelerate the rotation of eccentric 8a; excessive slackening of the loop causes a swing in the reverse sense to cut in a resistance with the opposite effect.

Figure 8:
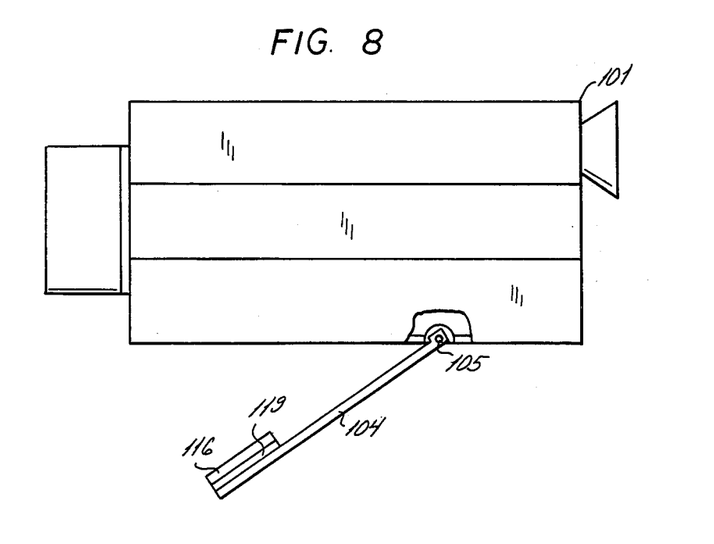
FIG. 8 is a top plan view, partly broken away, of another camera embodying our invention.
Figure 9A:
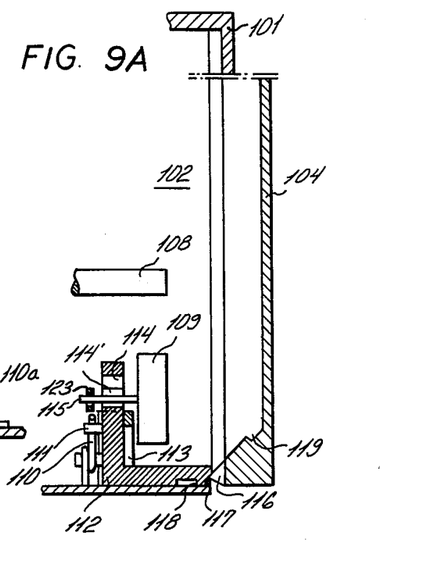
FIG. 9A is a fragmentary view, in sectional elevation, of part of an actuating mechanism in a camera of the type illustrated in FIG. 8.
Figure 9B:
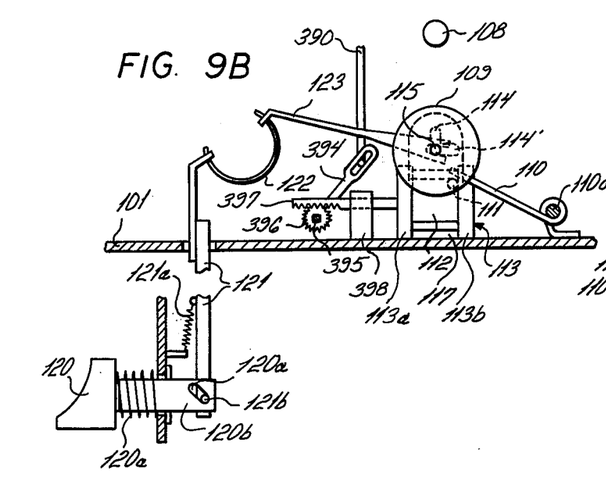
FIG. 9B is a face view of the assembly shown in FIG. 9A.

In FIGS. 8, 9A and 9B we have shown a camera casing 101 forming a cassette-receiving chamber 102 which accommodates, in the general manner illustated in FIG. 1, a capstan 108 and an associated pinch roller 114 in the vicinity of a sound-recording head overlying a film strip of an inserted cassette (not shown in these Figures). The casing 101 is provided with a lid or door 104 which is hinged to it at 105 so as to facilitate loading and unloading.

A hairpin spring 110, coiled about a fixed stud 110a near the bottom of casing 101, bears from above upon a pin 111 on an elbow 112 slidably received between two flanged cheeks 113a, 113b of a carriage 113 which is slidable across that bottom in nonillustrated guide rails. Slide 112 has a generally L-shaped slot 114 traversed by the shaft 115 of pinch roller 109 which is vertically displaceable within that slot in the illustrated carriage position and is maintained horizontal by further guide means not shown. The end of shaft 115 remote from roller 109 is bracketed by a bifurcate extremity of a rod or clevis 123 whose opposite extremity is connected via an arcuate toggle spring 122 with a bar 121 extending outwardly into the handgrip 82 (FIG. 1) of the camera. Trigger 120, working against a biasing spring 120a, has a stem 120b provided with a slot 20c receiving a pin 121b of bar 121 which is biased downwardly by a spring 121a. Thus, the exertion of finger pressure on trigger 120 by the user holding the handgrip raises the bar 121 against the force of spring 121a, yet with the door 104 open this has no effect upon the position of pinch roller 109 whose shaft 115 is held down onto the lower end of slot 114 by the clevis 123 under the toggle action of spring 122.

In the illustrated inoperative or insertion position of slider 112, therefore, the film cannot be clamped between the roller and the capstan 108; thus, even with the capstan set in rotation by closure of the trigger-controlled switch 172 (FIG. 7) the film is not driven. The door 104 is provided along its lower edge with a camming ledge 116 co-operating with a beveled edge 117 of slider 112 to elevate that slider when the door is closed. Beveled edge 117 forms part of a catch 118 which yieldably engages in a recess 119 of ledge 116 to hold the door in its closed position, under the restraining action of spring 110.

Carriage 113 is laterally shiftable, in dependence upon the presence or absence of a sound-film cassette in chamber 102, by a linkage more fully described hereinafter with reference to FIGS. 14 and 15, that linkage including a rod 390 articulated to a lever 394 which is rigid with a shaft 395 of a pinion 396 meshing with a rack 397. The rack, guided in a fixed bearing block 398, is secured to carriage 113 and holds it in its illustrated position whenever a sensor 386 (FIG. 14) detects a cassette 2 and lowers the rod 390. Otherwise, with rod 390 raised, carriage 113 is shifted to the left in FIG. 9B whereby shaft 115 comes to lie in a horizontal leg 114′ of slot 114 and is thereby prevented from clamping the film against capstan 108 even with the door closed.

The raising of slider 112 by the door ledge 116 into its operative position elevates the right-hand end (FIG. 9B) of toggle spring 122 sufficiently to let it snap past dead center into an alternate position in which it exerts an upward pressure upon the shaft 115. If the carriage 113 has been shifted into its illustrated unblocking position, i.e. if chamber 104 contains a cassette 2 (FIG. 1), this spring pressure elevates the shaft 115 (by a distance less than the length of the vertical leg of slot 114) into a standby position. Now a depression of trigger 120 is effective to eliminate the clearance still existing between the roller 109 and the capstan 108 so that the film will be driven; in this working position the shaft 115 still stays clear of the upper end of slot 114.

When the user releases the trigger 120 and reopens the door 104, spring 110 returns the slider 112 to its illustrated lower position whereby shaft 115 is depressed by the upper end of slot 114, causing toggle spring 122 to snap back to its original state. This re-establishes the insertion position in which a wide gap separates the capstan 108 from the princh roller 109.

If the capstan 108 is placed closer to the starting position of the pinch roller 109, the trigger 120 can be operated to move the pinch roller directly into a film-clamping position, with elimination of a standby position such as the one shown in FIG. 2B, provided that a sound-film cassette is present; the film will then be driven as soon as the capstan is set in motion by operation of the trigger.

In FIGS. 10A and 10B we show a mounting for pinch roller 109 generally similar to that of FIGS. 9A and 9B, except that the cheeks 113a and 113b are here a pair of posts fixedly rising from the bottom of the camera casing 101. The roller shaft 115 is here journaled in a bearing plate 124 having a pair of slots 124' which are traversed by pins of the elbow-shaped slider 112 whereby the shaft and its support are again interconnected by a lost-motion coupling. A loop detector within space 3 comprises a bell-crank lever 125 which is fulcrumed at 125' and bears with a roller 125'' on its lower end upon the film F moving from left to right in these Figures as indicated by an arrow 126, the film being guided by deflecting rollers 127 to form a loop which on standstill is maintained by the frictional resistance of supply and takeup spools 2a, 2b (FIG. 1). Thus, the loop slackens as the motor 62 (FIG. 7) is started to drive the traction claw 8 and tightens when the claw drive is stopped. Lever 125, biased in a loop-tensioning sense by a spring 128, is linked via a toggle spring 129 with another lever 130 having a fulcrum at 131, the opposite end of lever 130 being connected with bearing plate 124 through another toggle spring 132. The linkage 129, 130, 132 may also include a nonillustrated mechanical or electromechanical force amplifier in addition to that constituted by the toggle springs.

One of the cassette feelers 47 (or an extension thereof) is shown extending into the path of lever 130 so as to prevent any clockwise swing thereof from its illustrated position (as viewed in FIG. 10B) if there is no sound-film cassette in the receiving chamber 102. If such a cassette is absent, closure of the door 104 raises the pinch-roller support 112, 124 against the force of toggle spring 132 but leaves the roller 109 spaced from the capstan 108; this rise of plate 124 is insufficient to switch the spring 132 into its alternate state. In that case, of course, there is no film F in the illustrated position and the spring 128 is free to pivot the bell-crank lever 125 clockwise, with ineffectual tripping of toggle spring 129 inasmuch as lever 130 is prevented by the feeler 47 from swinging clockwise and acting upon the toggle spring 132.

In sound-film operation, however, the raising of pinch roller 109 into its standby position by the door ledge 116 is followed by the start of the claw drive whereby, upon the slackening of the film loop, the resulting clockwise swing of lever 125 and the toggle action of spring 129 pivots the lever 130 in the same sense whereby toggle spring 132 is also tripped and completes the displacement of pinch roller 109 into its working position in which it clamps the film F against the capstan 108.

Upon release of the trigger and consequent stopping of the claw drive, the tightening of the film loop reverses the aforedescribed toggle action whereby bearing plate 124 is biased downwardly and, together with elbow 112 loaded by hairpin spring 110, descends into the illustrated inoperative position when the door 104 is subsequently opened.

Figure 11:
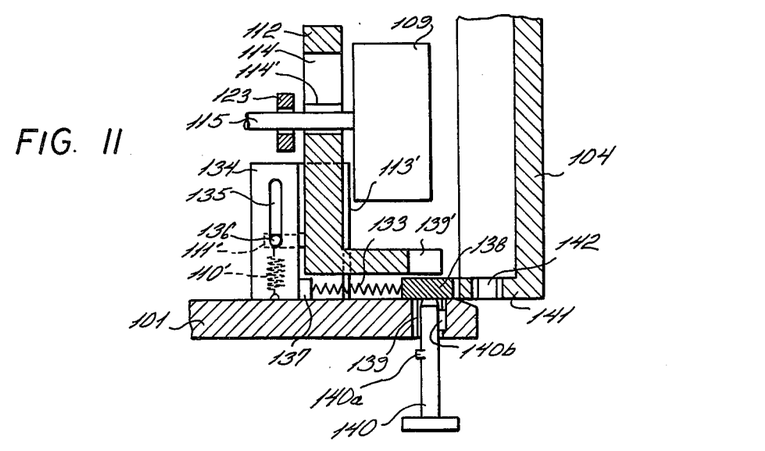
FIG. 11 is a view of the lower part of FIG. 10A drawn to a large scale and modified to show a further variant.

In FIG. 11 we have illustrated a modification of the lid-controlled activating mechanism of FIGS. 9A, 9B (or FIGS. 10A, 10B) in which the camming ledge 116 on door 104 is replaced by a straight foot 141 fitting into a clearance between the elbow 112 and the bottom of camera housing 101, that clearance being maintained by a rail 137 and a slide 138 separated by a compression spring 133. Hairpin spring 110 and pin 111 of FIGS. 9A and 9B have here been replaced by a tension spring 110' and a stud 111' from which two projections 136 extend into slots 135 of respective wings 134 (only one shown) of a modified carriage 113' slidable on the casing bottom along rail 137. Spring 110' is bracketed by the two slotted wings 134.

The bottom of casing 101 has a bore 139 accommodating a knob 140 serving to lock the door to the casing. Knob 140 has a projection 140a which fits into a lateral groove of bore 139, that bore being alignable with a hole 142 in foot 141 whenever the foot represses the slide 138 against the force of spring 133 upon closure of the door. A cutout 139' in the horizontal arm of elbow 112 registers with bore 139 whenever no sound-film cassette is present in the receiving chamber of the camera, i.e. when the shaft 115 is confined within the horizontal leg 114' of slot 114. If the cassette sensor shifts the carriage 113' into the unblocking position as shown in FIG. 9B, a solid portion of elbow 112 overlies the knob 140. Thus, as the knob is pushed upwardly into the hole 142 of the closed door, it either clears the cutout 139' or raises the elbow 112 together with shaft 115 and roller 109 against the force of spring 110', depending on the type of cassette (if any) loaded into the camera. In either case, the inserted knob 140 can be rotated to let its projection 140a come to rest on the upper surface of foot 141 for holding the door in position. Knob 140 is shown provided with a rib 140b which on the one hand prevents its extraction from the bore 139 and on the other hand insures alignment of projection 140a with the associated groove of bore 139 in the illustrated unlocking position of the knob.

It will be evident that such a locking knob, coacting with a capstan support such as elbow 112, can also be used in the embodiment of FIGS. 10A and 10B in which that support is not transversely slidable. In that instance, of course, the cutout 139' will be omitted.

Figure 12A:
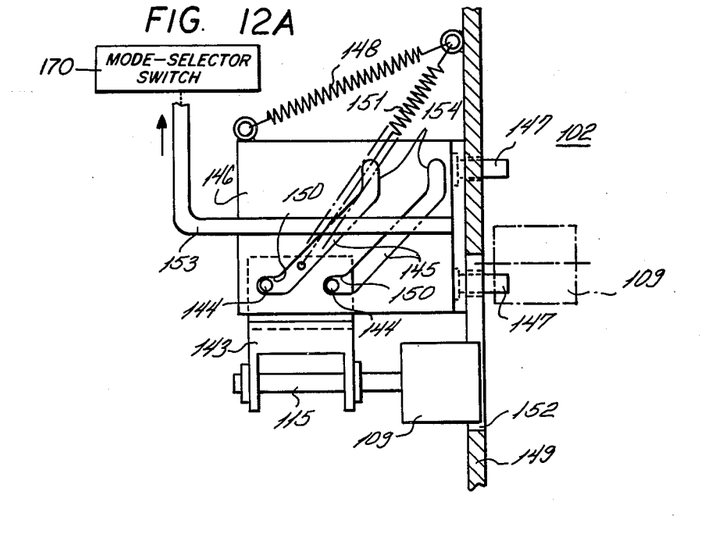
FIG. 12A is an elevational view of still another actuating mechanism according to our invention.
Figure 12B:
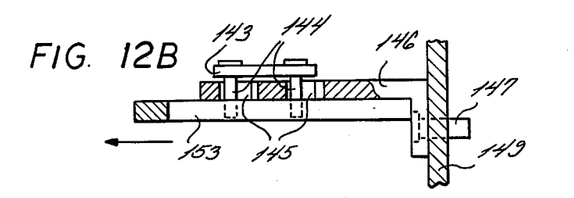
FIG. 12B is a top view of the assembly shown in FIG. 12A.

FIGS. 12A and 12B show a yoke 143 in which the shaft 115 of pinch roller 109 is journaled, that yoke being provided with a pair of pins 144 guided in two parallel camming slots 145 of a plate 146 which is rigid with a pair of cassette feelers 147 traversing a partition 149. The partition has an aperture 152 through which the capstan 109 is normally retracted from the cassette-receiving compartment 102. A tension spring 148, anchored to partition 149 and to plate 146, biases that plate so that feelers 147 project into the compartment 102 in the absence of a sound-film cassette. Another tension spring 151, also anchored to partition 149, engages the yoke 143 and tends to draw it upwardly, that motion being prevented in the illustrated plate position by the shape of camming slots 145 which terminate in horizontal lower extremities 150 and vertical upper extremities 154.

A mode-selector switch 170 controls the position of a bar 153 which is vertically shiftable and normally overlies the pins 144 of yoke 143, intersecting the camming slots 145 approximately midway along their height. If, now, a sound-film cassette is inserted into compartment 102 and represses the feelers 147, pins 144 move out of the horizontal slot extremities 150 whereupon yoke 143 is pulled upwardly by the spring 151, the pinch roller 109 being thereby elevated into a standby position as it traverses the aperture 152. From this standby position the pinch roller can be released by an upward movement of stop bar 153 upon suitable actuation of the mode-selector switch; the pins 144 then continue into the upper extremities 154 of solts 145 while roller 109 approaches the capstan (not shown in these Figures) to clamp the film therebetween. The illustrated retracted position can be restored, of course, by a lowering of bar 153 under the control of the mode-selector switch and a removal of the sound-film cassette from compartment 102 to let the spring 148 return the the plate 146 to its normal place alongside partition 149.

The mode-selector switch 170 connected with stop bar 153 could be operatively coupled with or replaced by an actuating element such as the trigger 120 or the loop detector 125 shown in preceding Figures.

Figure 13:
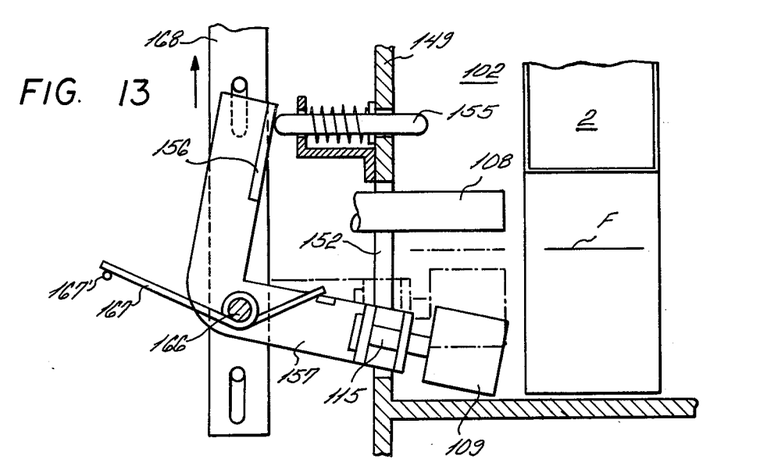
FIG. 13 is a fragmentary view generally similar to FIG. 11, illustrating yet another embodiment.

The embodiment of FIG. 13 comprises a vertically movable bar 168, again controlled by a mode-selector switch, a trigger, a loop detector or the like, on which a lever 157 is pivoted by means of a pin 166. Pinch roller 109, whose shaft 115 is journaled in an extremity of lever 157 passing through aperture 152 of partition 149, can be elevated into a standby position (dot-dash lines) by the depression of a spring-loaded feeler 155 upon the insertion of a cassette 2 into compartment 102, feeler 155 bearing upon a lug 156 near the other extremity of lever 157 which is biased in a clockwise direction by a hairpin spring 167 coacting with a stationary stop 167'. As in other embodiments, the cassette 2 may be held in position against the opposing spring forces by a suitable detent in the manner described earlier.

The final movement of roller 109 from its standby position into its working position, close to capstan 108, is carried out by an upward shift of bar 168 under the control of a mode-selector switch or an actuating member of the type referred to above.

Figure 14:
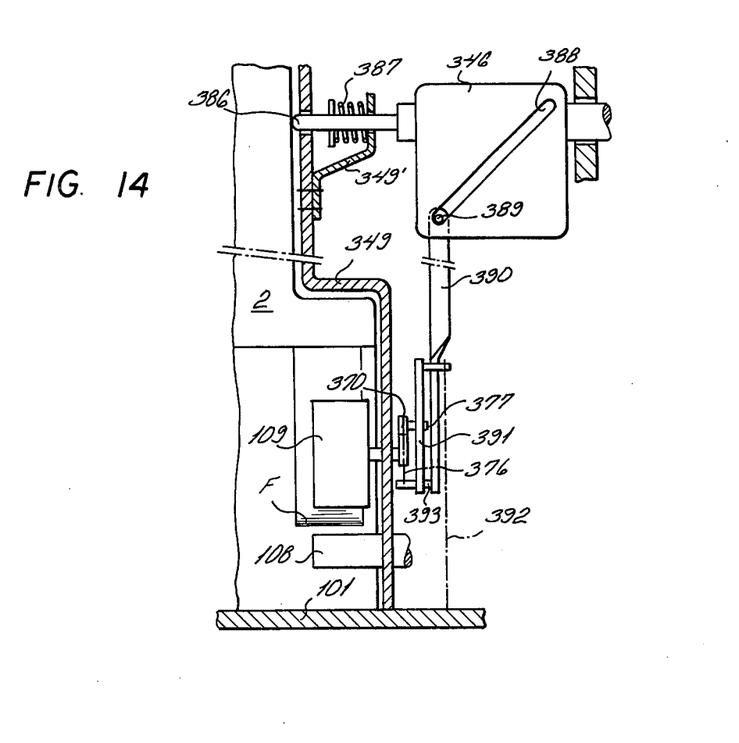
FIG. 14 is an elevational view of a linkage between a cassette sensor and an actuating mechanism according to a still further embodiment.
Figure 15:
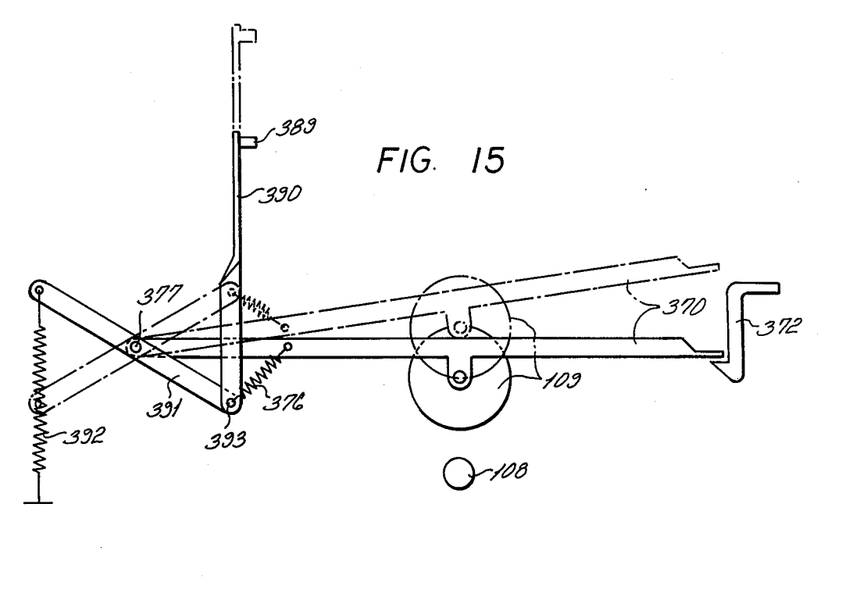
FIG. 15 is a face view of the lower part of the assembly shown in FIG. 14.

The system of FIGS. 14 and 15 includes a cassette feeler 386, loaded by a spring 387, which is rigid with a camming plate 346 having an inclined slot 388 engaged by a pin 389 at the top of the vertical rod 390 already discussed in conjunction with FIG. 9B. The lower end of rod 390 is articulated by a pin 393 to a lever 391 pivoted at 377 to an arm 370 which carries the pinch roller 109; the opposite end of lever 391 is biased downwardly by a tension spring 392 anchored to the bottom of camera housing 101. Pin 393 is linked with arm 370 via a tension spring 376 designed to swing the arm 370 either clockwise or counterclockwise about its floating fulcrum 377, depending upon the position of rod 390. Spring 387 bears upon a bracket 349' rigid with a partition 349.

As long as no sound-film cassette 2 is inserted in the receiving chamber to the left of partition 349, spring 387 draws the camming plate 346 to the left whereby slot 388 elevates the rod 390 so that the parts assume the position shown in phantom lines in FIG. 15. In that position the pinch roller 109 is retracted from the capstan 108 which in this instance is disposed below the roller. Upon the insertion of a cassette 2, plate 346 moves to the right and lowers the rod 390 whereupon the toggle mechanism 376, 391 reverses the spring force acting on arm 370 so that the free end of this arm comes to rest, in a standby position, on a hook 372 preventing the establishment of the clamping position. The lower part of rod 390 is sufficiently flexible to allow the pin 389 to travel over nearly the full length of slot 388 under the action of the aforedescribed toggle mechanism, even though the lateral displacement of plate 346 extends over only a fraction of that length.

In order to let the capstan 108 drive the film F, hook 372 is released from arm 370 by depression of the trigger, either directly or through a loop detector as already described. Removal of the cassette 2 reverses the operation of linkage 346, 390, 391 whereby arm 370 is swung counterclockwise (as viewed in FIG. 15) past the hook 372 into its retracted position.

In a simplified arrangement the lever 391 and the spring 376 could be omitted, the arm 370 being then rigid with rod 390 and being biased downwardly by the spring 392 directly anchored thereto. This, however, would require a steeper camming angle, with consequently increased wear of slot 388 and pin 389, and/or a larger stroke for the feeler 386 and the plate 346.

In the system of FIG. 9B the rod 390 could also be linked differently with a cassette feeler such as pin 386, e.g. through a bell-crank lever translating the horizontal motion of the feeler into a vertical motion of the rod.

We claim:

1. In a cine camera, in combination:
a casing having a chamber adapted to accommodate a sound-film cassette, said casing being provided with an exposure gate and sound-recording means;
sensing means in said casing for detecting the presence of a sound-film cassette in said chamber;
drive means in said casing for transporting a sound film past said exposure gate and said sound-recording means, said drive means including a continuously rotatable capstan and a pinch roller adapted to clamp said sound film therebetween;
energizing means for said drive means including manually operable trigger means;
relatively displaceable support means for said pinch roller and said capstan; and
actuating means in said casing coupled with said support means and controlled by said sensing means for relatively displacing said pinch roller and said capstan from a more widely separated normal position into a relatively closely spaced alternate position, preparatorily to operation of said trigger means, in the presence of a sound-film cassette in said chamber.

2. The combination defined in claim 1 wherein said actuating means comprises a mechanical linkage between said sensing means and said support means.

3. The combination defined in claim 2 wherein said support means comprises a movable holder for said pinch roller, said linkage engaging said holder for displacing said pinch roller into a standby position closer to said capstan than said normal position but still separated therefrom, further comprising manual operating means for displacing said pinch roller from said standby position into a film-clamping position proximal to said capstan, said operating means being ineffectual in said normal position.

4. The combination defined in claim 3 wherein said linkage includes biasing means responsive to detection of a sound-film cassette by said sensing means for resiliently urging said pinch roller toward said capstan.

5. The combination defined in claim 4, further comprising stop means for arresting said pinch roller in said standby position, said stop means being deactivable by said operating means.

6. The combination defined in claim 3 wherein said linkage comprises a movable mounting for said holder on said operating means.

7. The combination defined in claim 6 wherein said operating means comprises a mode-selector switch.

8. The combination defined in claim 1 wherein said support means comprises a movable holder for said pinch roller provided with biasing means for resiliently urging said pinch roller toward said capstan, said actuating means including a detent coupled with said sensing means for blocking the displacement of said holder by said biasing means in the absence of a sound-film cassette in said chamber.

9. The combination defined in claim 8 wherein said casing is provided with a lid for said chamber, further comprising prestressing means controlled by said lid for activating said biasing means upon closure of said chamber.

10. The combination defined in claim 9 wherein said biasing means comprises a toggle spring.

* * * * *